(12) United States Patent
Song et al.

(10) Patent No.: US 10,097,792 B2
(45) Date of Patent: *Oct. 9, 2018

(54) MOBILE DEVICE AND METHOD FOR MESSENGER-BASED VIDEO CALL SERVICE

(71) Applicant: Samsung Electronics Co., Ltd., Gyeonggi-do (KR)

(72) Inventors: Sejun Song, Seoul (KR); Jungsic Sung, Gyeonggi-do (KR); Junseok Lee, Seoul (KR); Chulhwan Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/881,387

(22) Filed: Oct. 13, 2015

(65) Prior Publication Data

US 2016/0037124 A1 Feb. 4, 2016

Related U.S. Application Data

(63) Continuation of application No. 14/010,817, filed on Aug. 27, 2013, now Pat. No. 9,172,905.

(30) Foreign Application Priority Data

Aug. 27, 2012 (KR) .................... 10-2012-0093942

(51) Int. Cl.
*H04N 7/15* (2006.01)
*H04N 7/14* (2006.01)
(Continued)

(52) U.S. Cl.
CPC ......... *H04N 7/141* (2013.01); *H04L 12/1818* (2013.01); *H04N 7/147* (2013.01);
(Continued)

(58) Field of Classification Search
None
See application file for complete search history.

(56) References Cited

U.S. PATENT DOCUMENTS 7,671,886 B2 3/2010 Sawada
8,301,174 B2 * 10/2012 An .................... H04M 1/72572
455/39
(Continued)

FOREIGN PATENT DOCUMENTS

CN 1893534 A 1/2007
CN 101433086 A 5/2009
(Continued)

OTHER PUBLICATIONS

Hands-On with Apple's new 1-15 FaceTime for MAC (Screenshots)—Disruptive Telephony; Oct. 20, 2010; KP055406912; http://www.disruptivetelephony.com/2010/10/hands-on-with-apples-new-facetime-for-mac-screenshots.html.
(Continued)

*Primary Examiner* — Creighton Smith
(74) *Attorney, Agent, or Firm* — Cha & Reiter, LLC

(57) ABSTRACT

A mobile device and method for a messenger-based video call service using camera preview image and voice information are provided. In the method, the mobile device displays a camera preview screen by executing a camera, and detects an input for selecting one or more sharers for a video call from the camera preview screen. Then, the mobile device executes a messenger for providing the video call service, transmits a connection request to the selected sharers through the messenger, and performs the messenger-
(Continued)

based video call with the sharers in response to the connection request.

10 Claims, 10 Drawing Sheets

(51) Int. Cl.
 *H04L 12/18* (2006.01)
 *H04W 4/21* (2018.01)
 *H04M 3/56* (2006.01)
(52) U.S. Cl.
 CPC .............. *H04W 4/21* (2018.02); *H04M 3/567* (2013.01); *H04M 2201/50* (2013.01); *H04N 2007/145* (2013.01)

(56) References Cited

U.S. PATENT DOCUMENTS

| | | | |
|---|---|---|---|
| 8,423,058 B2 | 4/2013 | Mathias et al. | |
| 8,704,863 B2 | 4/2014 | Santamaria et al. | |
| 8,874,090 B2* | 10/2014 | Abuan | H04N 7/147 348/14.01 |
| 2006/0181607 A1 | 8/2006 | McNelley et al. | |
| 2007/0070181 A1 | 3/2007 | Oh et al. | |
| 2007/0115346 A1 | 5/2007 | Kim et al. | |
| 2007/0263077 A1 | 11/2007 | Dhuey et al. | |
| 2009/0049395 A1 | 2/2009 | Lee et al. | |
| 2009/0231453 A1* | 9/2009 | Huang | H04N 5/144 348/220.1 |
| 2010/0201862 A1* | 8/2010 | Hatabu | H04N 5/3535 348/311 |
| 2011/0249079 A1 | 10/2011 | Santamaria et al. | |
| 2012/0081556 A1 | 4/2012 | Hwang et al. | |
| 2012/0136933 A1 | 5/2012 | Choi et al. | |
| 2012/0144320 A1 | 6/2012 | Mishra et al. | |
| 2012/0190388 A1 | 7/2012 | Castleman et al. | |
| 2013/0093954 A1 | 4/2013 | Chang et al. | |
| 2014/0109000 A1 | 4/2014 | Chiang et al. | |
| 2014/0189026 A1 | 7/2014 | Tange | |
| 2018/0032535 A1* | 2/2018 | Johnson | H04W 4/14 |

FOREIGN PATENT DOCUMENTS

| | | |
|---|---|---|
| CN | 101888608 A | 11/2010 |
| CN | 102215216 A | 10/2011 |
| EP | 2 355 508 A1 | 8/2011 |
| EP | 2 458 820 A1 | 5/2012 |
| JP | 2003-274376 A | 9/2003 |
| JP | 2006-352661 A | 12/2006 |
| JP | 2008-66975 A | 3/2008 |
| KR | 10-2007-0039248 A | 4/2007 |
| KR | 10-2010-0132573 A | 12/2010 |

OTHER PUBLICATIONS

Ilounge et al.; "The Complete Guide to FaceTime: Set-up, Use, and Troubleshooting Problems (2010) II iLounge Article"; Dec. 30, 2010; XP055406922; http://www.ilounge.com.index.php/articles/comments/the-complete-guide-to-facetime-set-up-use-and-troubleshooting-problems-2010.
Koyama Kaori; iPad Business Use Guide; Maeil Communications; Jul. 6, 2011; first edition; p. 188-191.
Chinese Search Report dated Jul. 31, 2017.
European Search Report dated Sep. 25, 2017.
Japanese Search Report dated Oct. 10, 2017.
Chinese Search Report dated Mar. 21, 2018.
Korean Search Report dated Apr. 12, 2018.
Korean Search Report dated Jun. 18, 2018.

* cited by examiner

MOBILE DEVICE AND METHOD FOR MESSENGER-BASED VIDEO CALL SERVICE

CROSS REFERENCE TO RELATED APPLICATIONS

This is a Continuation application of U.S. patent application Ser. No. 14/010,817 filed on Aug. 27, 2013 which claims the benefit under 35 U.S.C. § 119(a) of a Korean patent application filed on Aug. 27, 2012 in the Korean Intellectual Property Office and assigned Serial No. 10-2012-0093942, the entire disclosure of which is hereby incorporated by reference.

BACKGROUND

Field of the Invention

The present disclosure relates generally to a messenger-based video call service technology, and more particularly, to a mobile device and a method for a messenger-based video call service using camera preview image and voice information.

Description of the Related Art

With a growth of related technologies, a great variety of mobile devices, e.g., smart phones, tablet PCs, etc. are increasingly becoming popular these days. Mobile devices have outgrown of their respective traditional fields, and reached a mobile convergence stage. Not only many advanced functions, services and applications have been added to mobile devices, but steady improvements have also been made in various aspects such as size, design, resolution, and user interface.

For example, one of newly added services is a messenger service, also referred to as an instant messaging service, which allows real-time data transmission between mobile devices. Typically, a messenger service can offer multiuser chatting, photo, or video file transfer, voice call, video call, etc. through a data communication network when subscribers access a messenger server. With the recent advent of Wi-Fi and similar technologies, messenger-based voice call, video call, etc. are increasingly growing.

SUMMARY

Accordingly, the present invention is to address the above-mentioned problems and/or disadvantages and to offer at least the advantages described below.

One aspect of the present invention is to provide a technology for a messenger-based video call service that allows two or more users to share a camera preview image and voice information in mobile devices.

Another aspect of the present invention is to provide a mobile device and method for creating specific data by executing a specific function of the mobile device while a messenger-based video call is performed, and then for sharing the created data with other mobile devices.

According to one aspect of the present invention, a method for a messenger-based video call service in a mobile device, the method includes: displaying a camera preview screen by executing a camera function; detecting an input for selecting one or more sharers for a video call on the camera preview screen; executing a messenger application for initiating a messenger-based video call service; transmitting a connection request to the selected sharers through the messenger application; and performing the messenger-based video call with the selected sharers based on the response to the connection request.

According to another aspect of the present invention, provided is a mobile device for a messenger-based video call service, the mobile device comprising a wireless communication unit configured to access a messenger server and to transmit or receive messenger data to or from the messenger server; a touch screen configured to display a camera preview screen and to display a preview sharing screen restructured from the camera preview image; and a control unit configured to detect an input for selecting one or more sharers for a video call from the camera preview screen, to execute a messenger application for initiating the video call service, to transmit a connection request to the selected sharers through the messenger application, and to perform the messenger-based video call with the selected sharers in response to the connection request.

The present invention may support various functions of the mobile device such as a function to enter into a messenger-based video call service from a camera preview screen, a function to transmit and receive a camera preview image through a messenger application, a function to execute a specific function of the mobile device such as image capture, a memo input, a map display, or message transmission in a video call environment, and a function to create and transmit specific data in a video call environment.

Therefore, participants in a messenger-based video call service can share additional data such as location information, handwriting information, message information, photo, video, etc. as well as a preview image and voice information through a messenger. This can enhance the quality of a messenger-based video call service.

Other aspects, advantages, and salient features of the invention will become apparent to those skilled in the art from the following detailed description, which, taken in conjunction with the annexed drawings, discloses exemplary embodiments of the invention.

It is noted that in FIGS. 4 to 9, % S sign refers to a character string and may be used as the name of a video call sharer. Additionally, % N sign refers to a number and may be used to represent the number of photos.

DETAILED DESCRIPTION

Exemplary, non-limiting embodiments of the present disclosure are described in detail with reference to the accompanying drawings. It is noted that this disclosure may, be embodied in many different forms and should not be construed as limited to the exemplary embodiments set forth herein.

Instead, the disclosed embodiments are provided so that this disclosure can represent a thorough and complete description, and can convey the scope of the disclosure to those skilled in the art. The principles and features of this disclosure may be employed in a variety and plurality of embodiments without departing from the scope of the disclosure.

It is also noted that well known or widely used techniques, elements, structures, and processes may not be described or illustrated in detail to avoid obscuring the essence of the present disclosure for simplicity and clarity. Although the figures represent exemplary embodiments of the disclosure, the figures are not necessarily drawn to scale, and certain features may be exaggerated or omitted in order to better illustrate and explain the present disclosure.

In this disclosure, a camera preview screen may not necessarily represent data stored by image capturing, but may represent a screen output on a display unit after passing through image processing and buffering operations. The camera preview screen may be dynamically adjusted according to a change in an angle of a camera lens.

It is also noted that, a preview sharing screen refers to a screen restructured from a camera preview image and shared with one or more mobile devices through a messenger program to support a messenger-based video call.

A device to which this disclosure can be applied may include all kinds of electronic devices having a camera and supporting communication operations, such as a mobile device, a smart phone, a tablet PC, a handheld PC, a desktop PC, etc. Also, the device may have a multi-tasking function to simultaneously perform two or more tasks. However, it is noted that the following description is with reference to the device of this disclosure as a mobile device.

Figure 1:
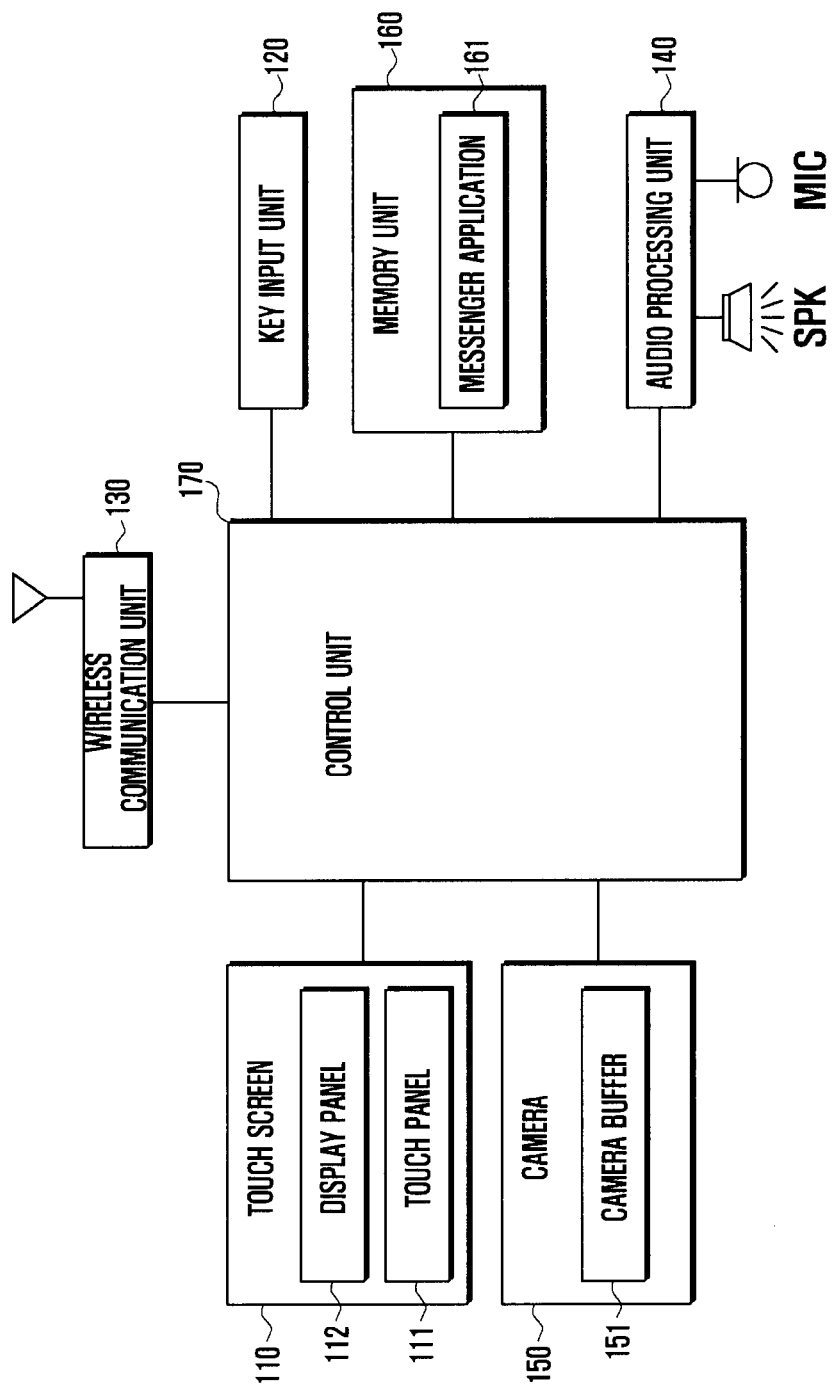
FIG. 1 is an example block diagram to illustrate the configuration of a mobile device in accordance with an embodiment of the present disclosure.

FIG. 1 is an example block diagram to illustrate the configuration of a mobile device in accordance with an embodiment of the present disclosure.

FIG. 1, depicts a mobile device 100. The mobile device 110 may include a touch screen 110 having a touch panel 111, and a display panel 112. The mobile device 100 may also include a hard key input unit 120, a wireless communication unit 130, an audio processing unit 140, a camera 150, a memory unit 160, and a control unit 170, or any combination thereof.

In some embodiments, the touch screen 110 may include the touch panel 111, and the display panel 112. The touch screen 110 may create a touch event in response to a user's input (e.g., a user gesture, etc.) and transmit the touch event to the control unit 170. The control unit 170 may then detect the user gesture from the touch event and execute a selected function of the mobile device 100 in response to the detected user gesture.

A user gesture may be classified as a touch, a touch gesture, etc. For example, a touch gesture may include a tap, a double tap, a long tap, a drag, a drag-and-drop, a flick, a press, etc. A touch may refer to a user's action to bring a touch input tool (e.g., a finger, a stylus pen, etc.) in contact with any point on a screen (e.g., the touchscreen 110). A tap may refer to an action to touch any point on the screen and then release (e.g., touch-off) the touch input tool from the touch point without moving the touch input tool. A double tap may refer to an action to tap twice any point on the screen. A long tap may refer to an action to touch the screen relatively longer, i.e., 100 ms, than a tap, and then releasing a touch input tool from the touch point without moving the touch input tool. A drag may refer to an action to move a touch input tool in an arbitrary direction while maintaining a contact with the screen. A drag-and-drop may refer to an action to drag and then release a touch input tool from the screen. A flick may refer to an action to move a touch input tool more quickly than a drag, and then releasing the touch input tool. A press may refer to an action to touch and push any point on the screen through a touch input tool. It is noted that, a touch refers to a state where any contact occurs on the touch screen 110, and a touch gesture refers to a movement of a touch which continues from touch-on to touch-off.

In some embodiments, the touch panel 111 may be placed on the display panel 112 (i.e., referred to as add-on type) or inserted in the display panel 112 (i.e., referred to as on-cell type, in-cell type, etc.). Also, the touch panel 111 may include a resistive type touch panel, a capacitive type touch panel, an electromagnetic induction type touch panel, etc.

In some embodiments, the display panel 112 may display information input by a user, or provided to a user as well as various menus of the mobile device 100. The display panel 112 may convert image data, received from the control unit 170, into analog signals and then display them based on one or more instructions from the control unit 170. The display panel 112 may provide various screens in connection with the use of the mobile device, e.g., a lock screen, an idle screen, a home screen, an application execution screen, a menu screen, a keypad screen, a message writing screen, an Internet access screen, a call screen, a game screen, a music play screen, a video playback screen, etc. The display panel 112 may be formed of any planar display panel such as LCD (liquid crystal display), OLED (organic light emitting diodes), AMOLED (active matrix OLED), or any other equivalents.

It is noted that, the display panel 112 of this disclosure may provide a camera preview screen and a preview sharing screen for a messenger-based video call service. Related user interfaces are described in detail below with reference to FIGS. 3-9.

In some embodiments, the key input unit 120 may include a plurality of input keys and function keys to receive user's input actions and to set up various functions. Examples of function keys include navigation keys, side keys, shortcut keys, and any other special keys defined to perform particular functions. Additionally, the key input unit 120 may receive a user's key manipulations for controlling the functions of the mobile device 100. The key input unit can create corresponding key input signals, and deliver them to the control unit 170. Such key input signals may include power on/off signals, volume regulating signals, screen on/off signals, etc. In response to the key input signals, the control unit 170 may send one or more instructions to one or more units of the mobile device 100. It is also noted that the key input unit 120 may include a QWERTY keypad, a 3*4 keypad, a 4*3 keypad, any other keypad formed of many keys with typical or special key arrangement, etc. When the mobile device 100 supports the touch panel 111 in the form of a full touch screen, the key input unit 120 may have only at least one side key, (e.g., a side key for power on/off, screen on/off, etc.) formed on any side of the body of the mobile device 100.

In some embodiments, the wireless communication unit 130 may perform transmission and reception of signals in connection with a voice call, a video call, or a data communication. Besides converting various data into wireless signals, and transmitting them to an external entity, the wireless communication unit 130 may also receive wireless signals from any external entity and convert them into suitable data. The wireless communication unit 130 may include a mobile communication module (e.g., a 3-generation mobile communication module, a 3.5-generation mobile communication module, a 4-generation mobile communication module, etc.), a short-range communication module (e.g., a Wi-Fi module, a Bluetooth module, etc.), and/or a digital broadcast module (e.g., a DMB module, etc.).

The audio processing unit 140 may be formed of a codec (i.e., a coder/decoder) which has a data codec for processing packet data and an audio codec for processing audio signals such as voice. The audio processing unit 140 can convert received digital audio signals into analog audio signals through the audio codec and output them through a speaker (as shown by label SPK in FIG. 1). The audio processing unit 140 may also convert analog audio signals received from a microphone (as shown by label MIC in FIG. 1) into digital audio signals using the audio codec and deliver them to the control unit 170. It is noted that, the audio processing unit 140 of this disclosure may collect and output voice information required for a messenger-based video call service.

In some embodiments, the camera 150 may capture an image and then send the captured image to the control unit 170. The camera 150 may include a front camera disposed at the front side of the mobile device 100, and/or a rear camera disposed at the rear side of the mobile device 100. It is noted that, in this disclosure, the camera 150 is configured to collect images utilized by a messenger-based video call service. Although not illustrated in the drawings, the camera 150 may include a camera sensor to convert received optical signals into electrical signals and a signal processor to convert analog image signals obtained by the camera sensor into digital data.

The camera 150 of this disclosure may include a camera buffer 151 to temporarily stores image signals received from the camera sensor (for example, temporarily storing image signals), in a preview mode for a given time. Such image data temporarily stored in the camera buffer 151 may be data used in a messenger-based video call service. For example, when a messenger-based video call service is started, the control unit 170 may extract data from the camera buffer 151, convert the extracted data into a suitable form for a data communication, and control transmission of the converted data to a messenger server.

The memory unit 160 may store an operating system (OS) of the mobile device 100, various applications etc. The memory unit 160 may also store various kinds of data created in the mobile device 100, or received from any external entity (e.g., any external server, other mobile device, PC, etc.). The memory unit 160 may store user interfaces and settings information (e.g., configuration settings information, etc.) in connection with functions of the mobile device 100.

In this disclosure, the memory unit 160 may store a messenger application 161, which refers to a specific application for supporting a messenger function of the mobile device 100. Also, the memory unit 160 may store data associated with use of a messenger function while the messenger application 161 is activated. It is noted that, when the messenger application 161 is activated in response to the execution of a camera function, the mobile device 100 may perform a process for accessing a messenger server according to a user's input or a predetermined schedule. For access to the messenger server, the mobile device 100 should be registered in advance with a messenger service and. If the mobile device 100 is not registered in advance, the mobile device 100 may perform one or more operations for registration procedure. When the mobile device 100 sends access information to the messenger server after activation of the messenger application 161, the messenger server can authenticate the mobile device 100 based on the access information received from the mobile device 100, and then approves access.

In some embodiments, the control unit 170 can control operations of the mobile device 100. For example, the control unit 170 can controls signal flows between different units of the mobile device 100, and processes data. The control unit 170 may also control power supply from a battery to different units of the mobile device 100. Additionally, once power is supplied, the control unit 170 may control a booting process, and execute various kinds of applications stored in the memory unit 160 to perform selected functions of the mobile device 100.

In one embodiment, the control unit 170 may control a menu function to select or add a messenger member on a camera preview screen, a function to enter into a messenger-based video call service from the camera preview screen, a function to transmit or receive a camera preview image through the messenger application, a function to execute a specific function of the mobile device such as image capture, a memo input, a map display, message transmission, voice recording, etc. in a video call environment, and a function to create and transmit specific data in a video call environment. The above mentioned functions of the control unit 170 in a messenger-based video call service are described below in detail with reference to various screenshots in FIGS. 3-9.

With developments in digital convergence tendencies, the mobile device 100 may essentially or selectively further include any other elements such as a sensor module for detecting location-based information, a GPS module for measuring the location of the mobile device 100, etc. Meanwhile, as will be understood by those skilled in the art, some of the above-mentioned elements in the mobile device 100 may be omitted or replaced with other element(s). Also, the mobile device 100 may further or alternatively use any other input unit such as a touch pad, trackball, etc.

Figure 2:
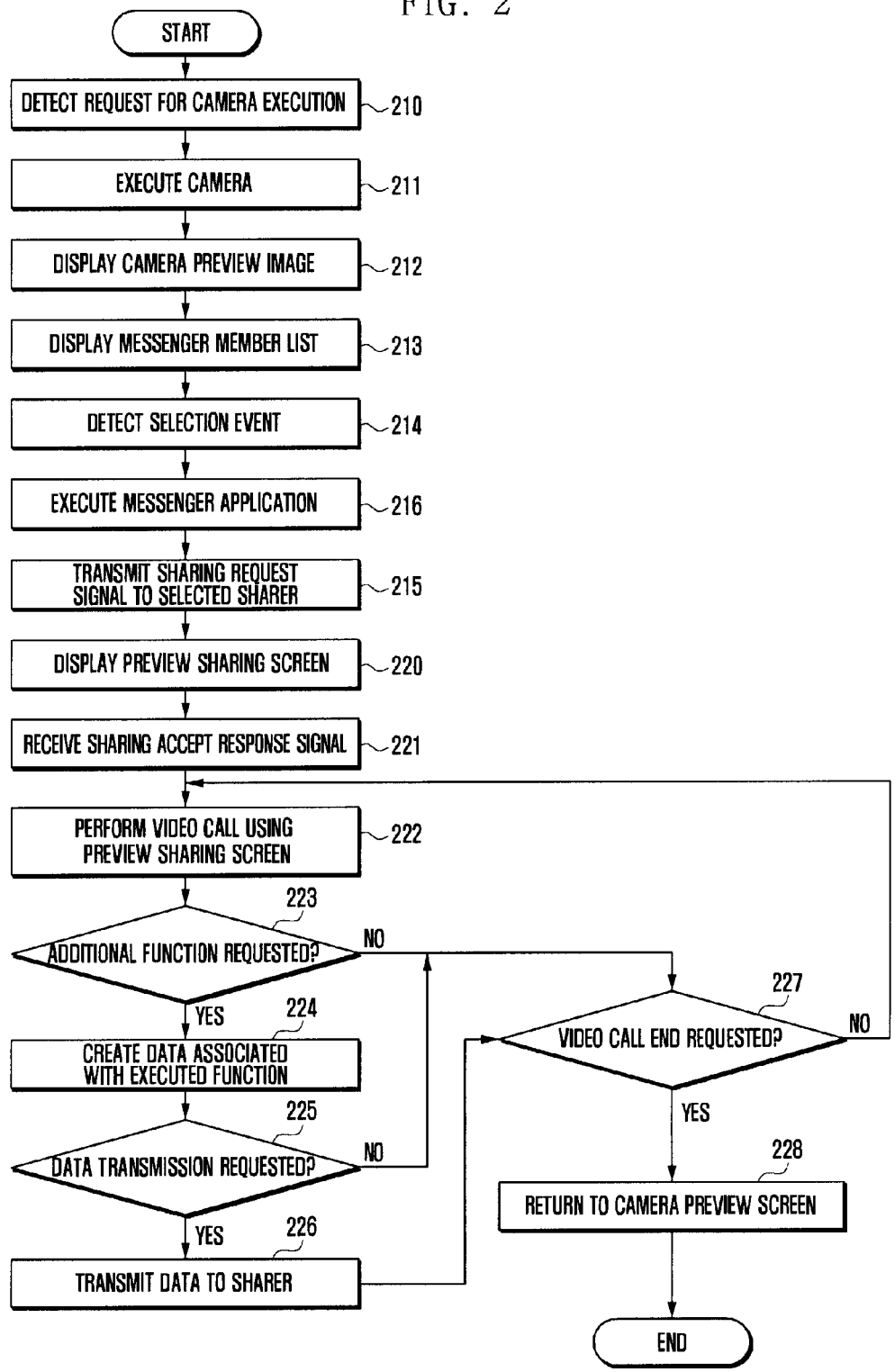
FIG. 2 is a flow diagram illustrating example operations of a messenger-based video call service from a mobile device in accordance with an embodiment of the present disclosure.

FIG. 2 is a flow diagram illustrating example operations of a messenger-based video call service from a mobile device in accordance with an embodiment of the present disclosure.

At block 210, the control unit 170 (as described above with reference to FIG. 1) detects a user's input for requesting a camera execution. The flow continues to block 211.

At block 211, the control unit 170 executes a camera function in response to the detected input. The flow continues to block 212.

At block 212, the control unit 170 displays on the display panel 112 a camera preview screen to show an image captured by the camera unit 150. The camera preview screen may not necessarily show data stored by image capturing, but may represent a screen output on the display panel 112 just after passing through image processing and buffering operations. The camera preview screen may be dynamically varied according to a change in an angle of a camera lens. For example, the dynamic variation may easily allow a user to select a subject and adjust its composition through a dynamic preview image. The flow continues to block 213.

At block 213, the control unit 170 displays on the display panel 112 a list of messenger members in response to a user's input signal. In one example, the camera preview screen contains a messenger menu to support a messenger-based video call service in a camera execution mode. When the messenger menu is selected by the user, the control unit 170 retrieves a list of messenger members from the memory unit 160, and outputs the retrieved list to the display panel 112. The messenger member list may be a list of other device users who accept a preview sharing service. The flow continues to block 214.

At block 214, the control unit 170 detects a selection event for selecting at least one sharer from messenger members in the list. The mobile device 100 can support a multilateral video call service, and the selected messenger members can become sharers for a multilateral video call in this disclosure. Therefore, at step 215, the control unit 170 executes a messenger application to perform a video call service with the selected sharer, and then accesses a messenger server through the messenger application. Additionally, the control unit 170 may activate the audio processing unit 140 to send and receive voice. The flow continues to block 216.

At block 216, the control unit 170 transmits a request signal for a messenger-based video call service to the selected sharer's mobile device. The flow continues to block 220.

At block 220, the control unit 170 displays on the display panel 112 a preview sharing screen to perform a video call based on a messenger. The preview sharing screen refers to a user interface screen restructured from the above-mentioned camera preview image so as to support a messenger-based video call. The flow continues to block 221.

At block 221, the control unit 170 receives a response signal for accepting a video call from any sharer to which the request signal is transmitted. At this time, the control unit 170 may receive voices and images from the video call sharer. The flow continues to block 222.

At block 222, the control unit 170 performs a video call service while sharing camera preview images and voices with sharer's mobile device. In one example, the control unit 170 collects data temporarily stored in the camera buffer 151 from a time point when the response signal is received. Also, the control unit 170 converts the collected data into a suitable form for a data communication and then transmits it as video call data to a messenger server. The control unit 170 further receives video call data from the messenger server, converts it into a suitable form for the preview sharing screen, and outputs it to the display panel 112.

At block 223, the control unit 170 determines whether a request event for an additional function is detected in a video call environment. In this disclosure, the mobile device 100 can support, in a video call environment, a camera control function, an image capturing function, a handwriting function, a location indication function, a data transmission function, etc. For example, the control unit 170 may detect an input event requesting the image capturing function in a messenger-based video call environment. In one embodiment, the image capturing function, also referred to as a camera shutter function, may be invoked in response to an input signal from a specific hard key. In another embodiment, menu items displayed on the screen may contain a shutter button, and the image capturing function may be invoked in response to an input signal from the shutter button.

If a request event for an additional function is detected at step 223, at block 224, the control unit 170 creates data association caused by the execution of an additional function. For example, in a messenger-based video call environment, the control unit 170 may enter into an image capturing mode, a handwriting mode, etc. according to a user's selection and then create a photo, a memo, etc. The flow continues to block 225.

At block 225, the control unit 170 determines whether to transmit the created data to the video call sharer. If there is a request for data transmission, the control unit 170 transmits the created data to the video call sharer at step 226.

After step 226 is performed, or if no request event is detected at step 223, the control unit 170 determines at step 227 whether an ending request for a video call is detected. In case of no branch at step 225 or 227, the control unit 170 may perform operations at block 222. If ending request for a video call is detected at step 227, the control unit 170 ends a messenger-based video call and returns to the camera preview screen at step 228.

Examples of screen interfaces associated with a messenger-based video call service are described in detail in FIGS. 3-9.

Figure 3:
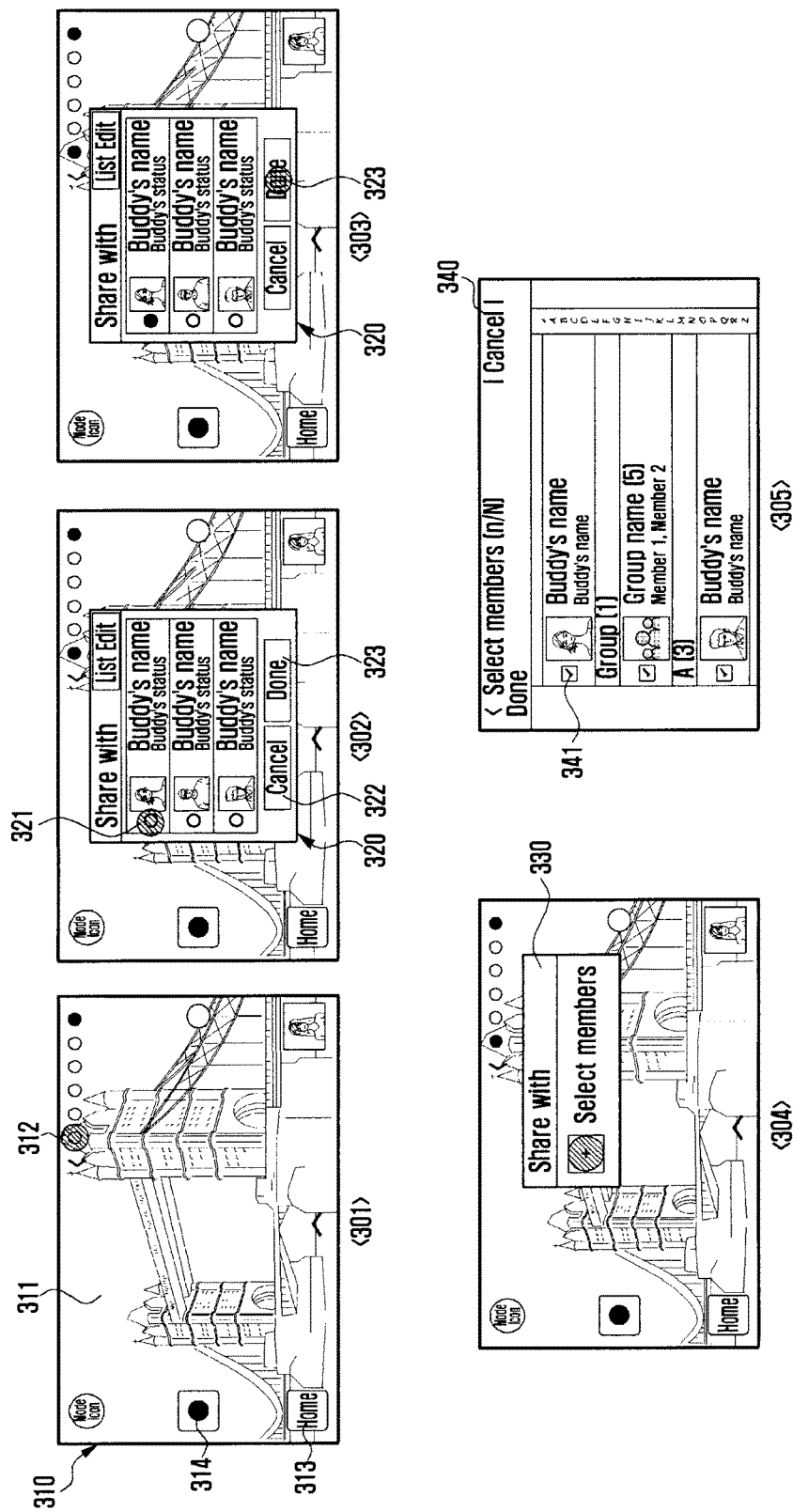
FIG. 3 illustrates example screenshots to select a member for a messenger-based video call service and send a sharing request to the selected member in accordance with an embodiment of the present disclosure.

FIG. 3 illustrates example screenshots to select a member for a messenger-based video call service and send a sharing request to the selected member in accordance with an embodiment of the present disclosure.

Referring to FIG. 3, the control unit 170 operates in a camera execution mode in response to user's request for a camera function.

As shown in screenshot 301 of FIG. 3, the display panel 112 of the touch screen 110 displays a camera preview screen 310 thereon under the control of the control unit 170. The camera preview screen 310 may have a view region 311 for showing a real-time image obtained through the camera unit 160, and camera function key regions including, but not limited to, a messenger menu button 312 for supporting a video call service, a home button 313 for changing to the home screen, and a shutter button 314 for capturing an image. Other various buttons associated with camera functions may be further used in the camera function key regions. The view region 311 shows a real-time preview image which is obtained, image-processed and buffered through the camera unit 160. The camera preview screen 310 may be a preview image obtained through a front camera or a rear camera.

While the camera preview screen 310 is displayed, a user can select the messenger menu button 312 to activate a messenger-based video call service. In response, the touch screen 110 transmits a selection input signal to the control unit 170, which extracts identification information about messenger members from the memory unit 160 in response to the selection signal. For example, the control unit 170 may retrieve a buddy list of the messenger application 161.

As shown in screenshot 302 of FIG. 3, the touch screen 110 displays a list 320 of messenger members who have already accepted a messenger-based video call service. The messenger member list 320 may contain information 321 about at least one member, a list edit menu, a cancel button 322, and a done button 323. The messenger member list 320 may include a buddy list used in a messenger service. Specifically, the control unit 170 may collect, through the messenger application, information about messenger members whose mobile devices are available for a messenger-based video call service, and then offer the messenger member list 320 based on the collected information to the touch screen 110. The number of members shown in the messenger member list 320 may be varied according to user's setting.

A user can select a desired recipient or sharer of a video call from the messenger member list 320. It is noted that, since a multilateral video call service is available for this disclosure, a user can select one or more sharers.

After selection, as shown in screenshot 303 of FIG. 3, a user can select the done button 323 to perform a messenger-based video call service with the selected sharer. Then, the control unit 170 transmits a request signal for a messenger-based video call service to selected sharer's mobile device, and then communicates if the request been accepted by the selected sharer(s).

Meanwhile, as shown in screenshot 304 of FIG. 3, the touch screen 110 may display an addition menu 330 for adding a video call sharer when there is no member accepting a messenger-based video call service. If a user selects this menu 330, the touch screen 110 displays a buddy list offered from a messenger service as shown in screenshot 305 of FIG. 3. Then, a user can select a desired sharer from the displayed buddy list to add it to the messenger member list.

Figure 4:
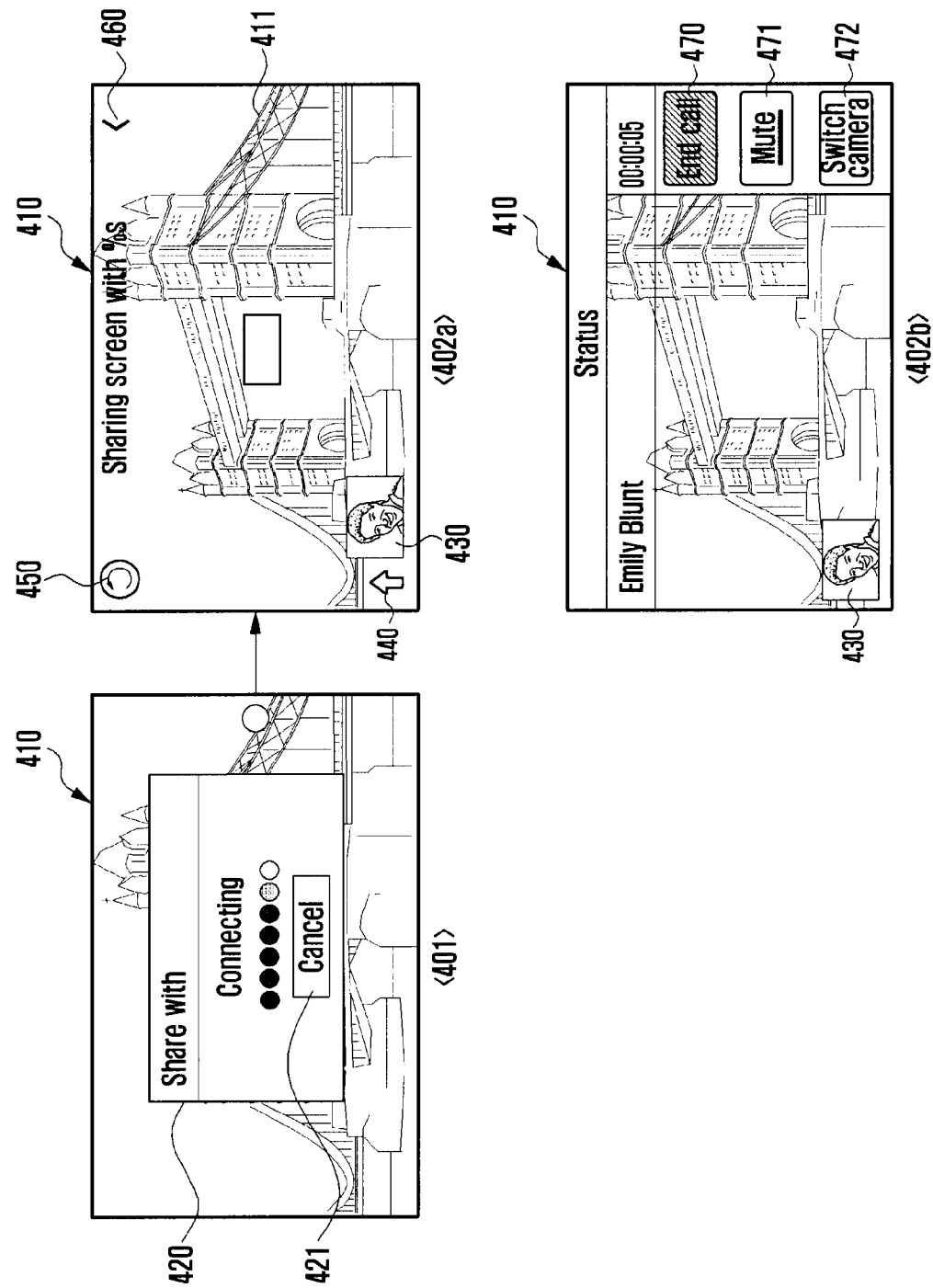
FIG. 4 illustrates screenshots of a connection process for a messenger-based video call service in accordance with an embodiment of the present disclosure.

FIG. 4 illustrates screenshots of a connection process for a messenger-based video call service in accordance with an embodiment of the present disclosure.

When any sharer is selected for a messenger-based video call service as discussed above with reference to FIG. 3, the touch screen 110 displays a popup window 420 for indicating the progress of requesting a connection of a video call under the control of the control unit 170 as shown in screenshot 401 of FIG. 4. This popup window 420 may contain a cancel button 421 such that a user can cancel a connection request.

When a response signal for accepting a video call from any sharer is received, the touch screen 110 displays a preview sharing screen 460 under the control of the control unit 170 as shown in screenshot 402a of FIG. 4. The preview sharing screen 460 refers to a user interface screen restructured from the above-mentioned camera preview image so as to support a messenger-based video call.

Before displaying the preview sharing screen 460, the control unit 170 executes a messenger application with the selected sharer and then performs a connection process to a messenger server. To perform a messenger-based video call service, the control unit 170 may transmit and receive, to and from the video call sharer's mobile device through the messenger server, image data outputted on the display unit just after passing through image processing and buffering. Namely, the control unit 170 enters into a messenger-based video call mode.

The preview sharing screen 460 may contain, but not limited to, a view region 411 for showing a camera preview image, a sharer view region 430 for showing a sharer's preview image, a home button 440 for returning to the home screen, an end button 450 for ending a video call, and a camera function setting menu 460. Further, the camera function setting menu 460 may include menu items for supporting a handwriting mode function, a location indication function, a camera remote control function, a camera shutter function, etc. in a video call environment. Also, the camera function setting menu 460 may support a hiding function and an opening function in the view region 411. Based on the number of sharers, one or more sharer view regions 430 may be displayed at the same time.

The preview sharing screen 410 may be differently configured depending on whether a mobile device provides or not a call function through a mobile communication network. In FIG. 4, screenshot 402a shows the preview sharing screen in a mobile device without a call function, and screenshot 402b shows the preview sharing screen in a mobile device with a call function. In the latter case, the preview sharing screen may contain a call end button 470, a mute button 471 and a camera switch button 472.

Meanwhile, in screenshot 402a, a sign % S refers to character string and may be used to indicate the name of a video call sharer.

Figure 5:
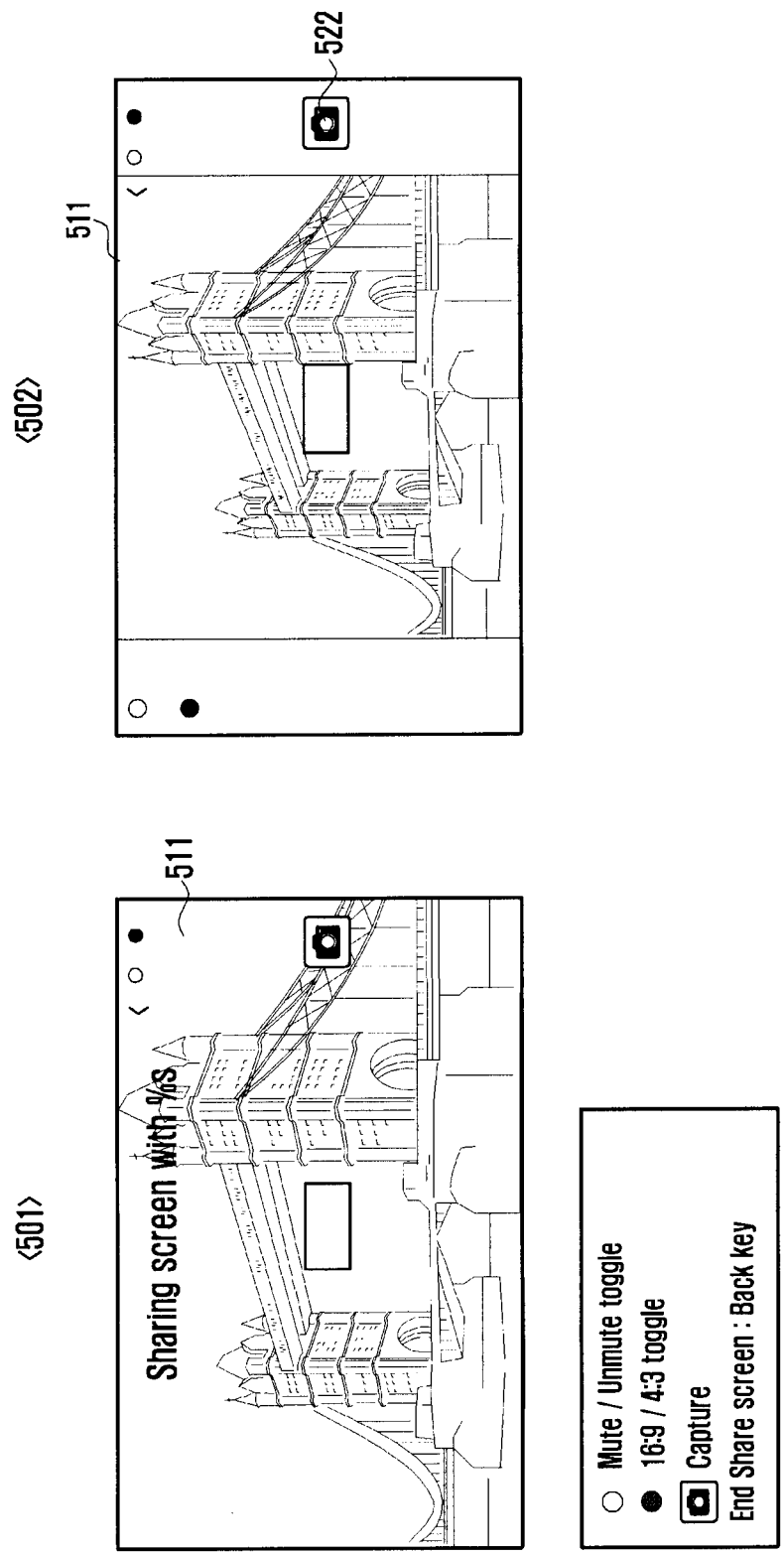
FIG. 5 illustrates screenshots of an additional camera function of a messenger-based video call service in accordance with an embodiment of the present disclosure.

FIG. 5 illustrates screenshots of an additional camera function of a messenger-based video call service in accordance with an embodiment of the present disclosure.

Referring to FIG. 5, the mobile device of this disclosure may support a function control of the camera in a video call mode.

A user can select the camera function setting menu 460 on the preview sharing screen 460 shown in FIG. 4. The camera function setting menu 460 may include, but not limited to, menu items for a mute control, a screen ratio adjustment, a camera switch, a camera shutter button, a camera function control authority setting, a map display, a handwriting mode, etc. The mute control menu item is to mute the sound in a video call. The screen ratio adjustment menu item is to adjust a screen ratio of the view region. The camera switch menu item is to perform a switch between the front camera and the rear camera. The camera function control authority setting menu item is to authorize a video call sharer to control a camera function. The map display menu item is to support a location indication function to indicate the location of a mobile device in a view region. The handwriting mode menu item is to support a handwriting function in a video call.

As shown in screenshot 501 of FIG. 5, the preview sharing screen may be displayed at a specific screen ratio adapted to the touch screen. For example, the screen ratio in this case may be 16:9.

When a user adjusts a screen ratio through the screen ratio control menu, the screen ratio may be changed as shown in screenshot 502 of FIG. 5. For example, if the screen ratio in screenshot 501 is 16:9, the screen ratio in screenshot 502 may be changed to 4:3.

Display screens shown in FIG. 5 are exemplary only and may be varied according to camera function control menu. For example, if a user selects a camera button add menu item in the camera function menu. Then, a camera shutter button may be added to the preview sharing screen, and a user can select the shutter button to capture an image or start a video recording. Although not illustrated in the drawings, the preview sharing screen may further have a menu item for a toggle function between an image capturing and a video recording. Alternatively, a separate hard key or button may be used for this toggle function.

Figure 6:
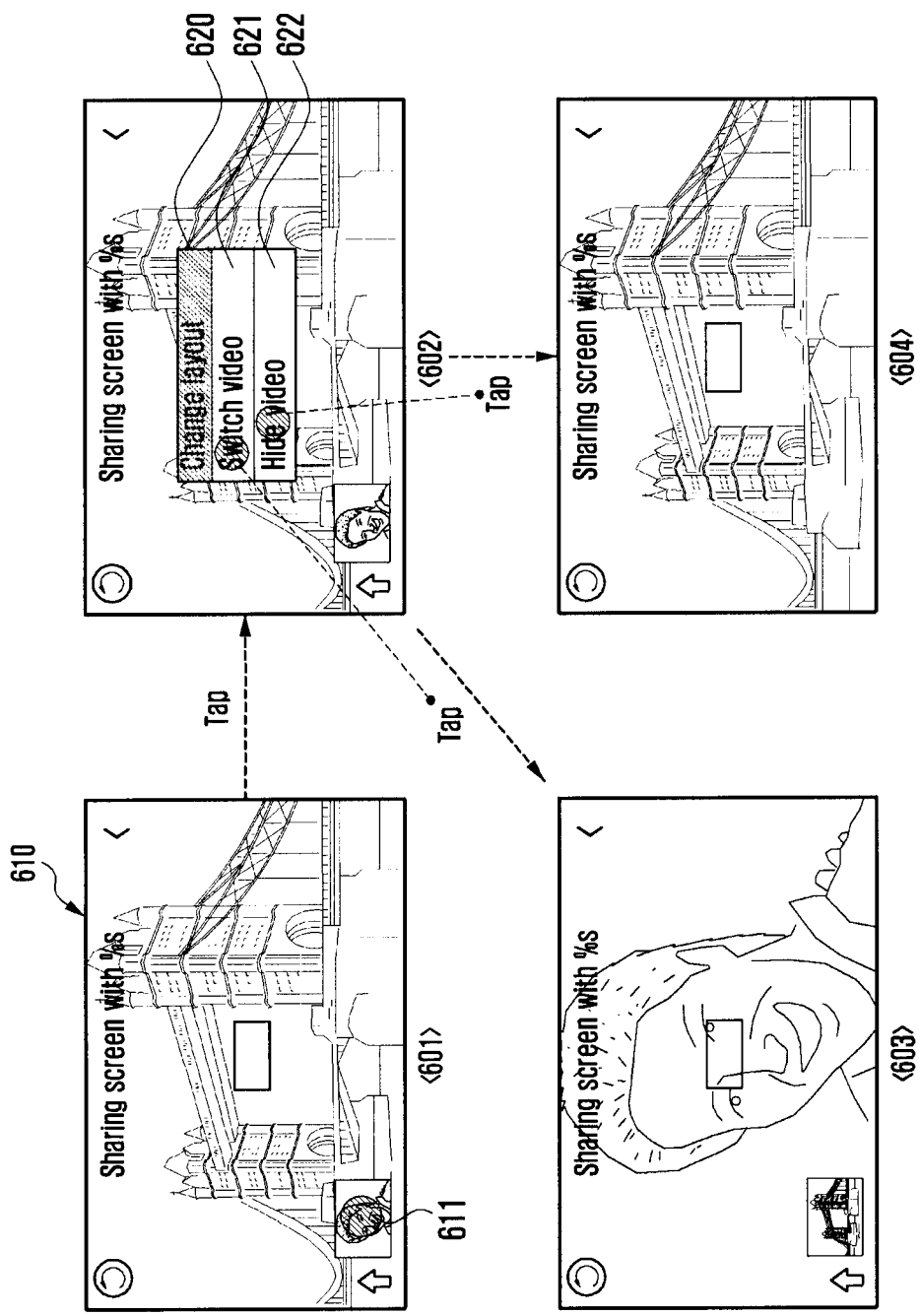
FIG. 6 illustrates screenshots of a screen change function of a messenger-based video call service in accordance with an embodiment of the present disclosure.

FIG. 6 illustrates screenshots of a screen change function of a messenger-based video call service in accordance with an embodiment of the present disclosure.

Referring to FIG. 6, in a messenger-based video call mode, the touch screen 110 displays the preview sharing screen 610 as shown in screenshot 601. A user can select the sharer view region 611 on the preview sharing screen 610. Then, the touch screen 110 may display a screen layout change menu 620 under the control of the control unit 170. The screen layout change menu 620 may contain menu items of a switch video 621 and a hide video 622. The switch video menu item 621 is to support a screen change between the sharer view region and the view region. The hide video menu item 622 is to support a function to hide the sharer view region.

A user can select the switch video menu item 621 on the screen layout change menu 620 as shown in screenshot 602. Then, the touch screen 620 may change the sharer view region and the view region in the preview sharing screen under the control of the control unit 170 as shown in screenshot 603.

Additionally, a user can select the hide video menu item 622 on the screen layout change menu 620 as shown in screenshot 602. Then, the touch screen 620 may remove the sharer view region from the preview sharing screen under the control of the control unit 170 as shown in screenshot 604. In this case, a voice call function may be still performed.

Figure 7:
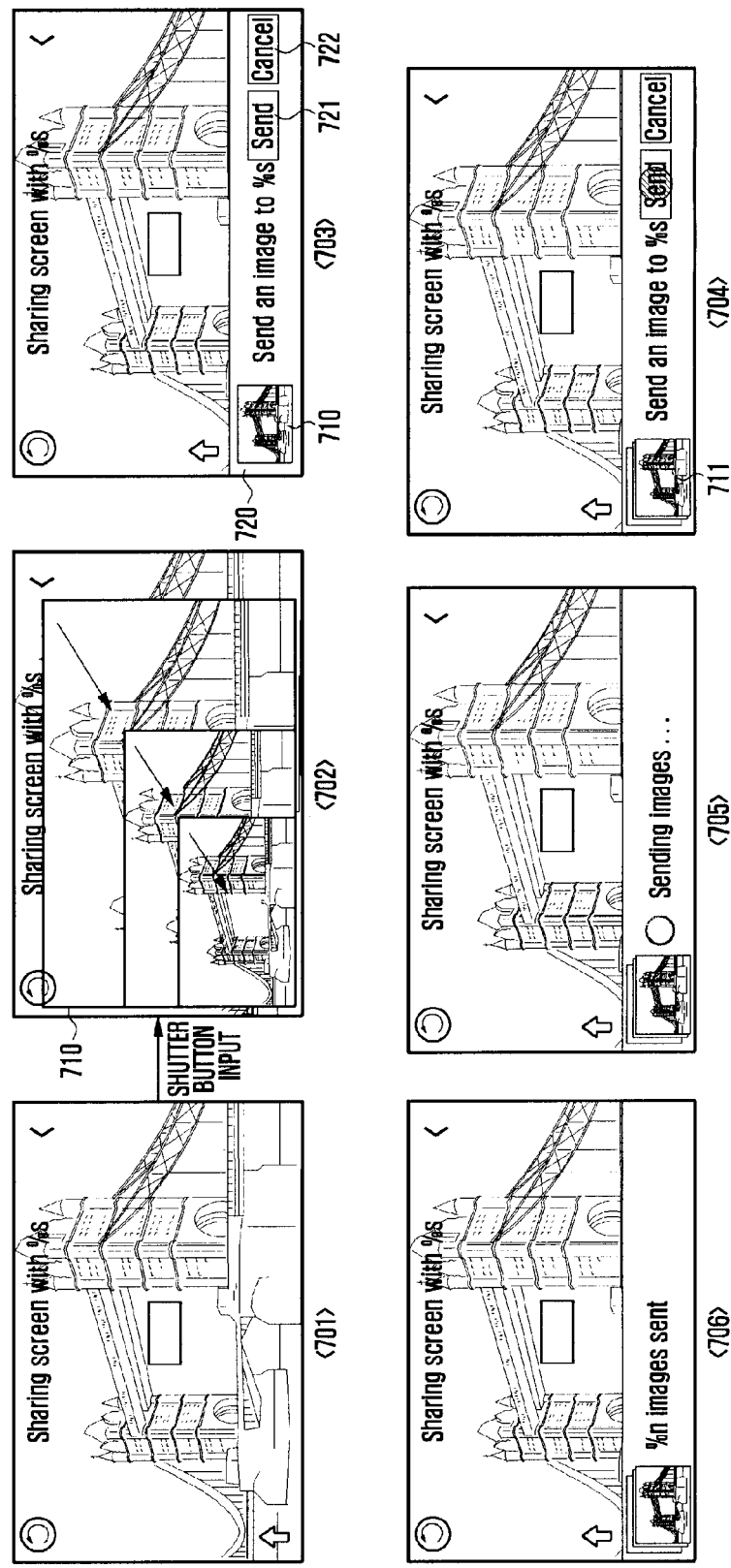
FIG. 7 illustrates screenshots of a camera shutter function and a data transmission function of a messenger-based video call service in accordance with an embodiment of the present disclosure.

FIG. 7 illustrates screenshots of a camera shutter function and a data transmission function of a messenger-based video call service in accordance with an embodiment of the present disclosure.

Referring to FIG. 7, when a hiding function of sharer view region is performed in a video call mode as discussed above, the touch screen 110 displays the preview sharing screen without a sharer preview region as shown in screenshot 701.

At this time, a user can select a camera shutter function. For example, the camera shutter function may be performed in response to an activation of a hard key input. However, if a camera shutter button is added as a menu item to the touch screen, the camera shutter function may be performed in response to a selection of the camera shutter button displayed on the screen. Alternatively, the camera shutter function may be performed in response to a predefined gesture or voice input.

When the camera shutter function is performed, an image being displayed in the preview sharing screen is captured under the control of the control unit 170. The captured image may be a still image at the time point when the shutter button is selected. Also, the captured image may be reduced in size to a thumbnail image as shown in screenshot 702, and then may be disposed at the bottom of the preview sharing screen as shown in screenshot 703. And also, a suitable animation effect may be added as shown in screenshot 702 when the captured image is reduced in size. At the bottom of the preview sharing screen, a send button 721 and a cancel button 722 may be further displayed together with a message for inquiring whether to send the captured image, as shown in screenshot 703.

A user can select the send button 721 to send the captured image to the video call sharer. Meanwhile, the mobile device of this disclosure may support a continuous capturing function in a messenger-based video call mode. When the continuous capturing function is performed, continuously captured images may be overlapped to each other at the bottom of the preview sharing screen as shown in screenshot 704.

When a user selects transmission of captured image to the video call sharer, the preview sharing screen may display a message for indicating the progress of transmission as shown in screenshot 705. After transmission is completed, any related information for indicating the completion of transmission may be displayed. In screenshot 706, a sign % N refers to a number and may be used as the number of the sent images.

In another embodiment, a video may be recorded in a messenger-based video call mode and then sent to the video call sharer.

Figure 8:
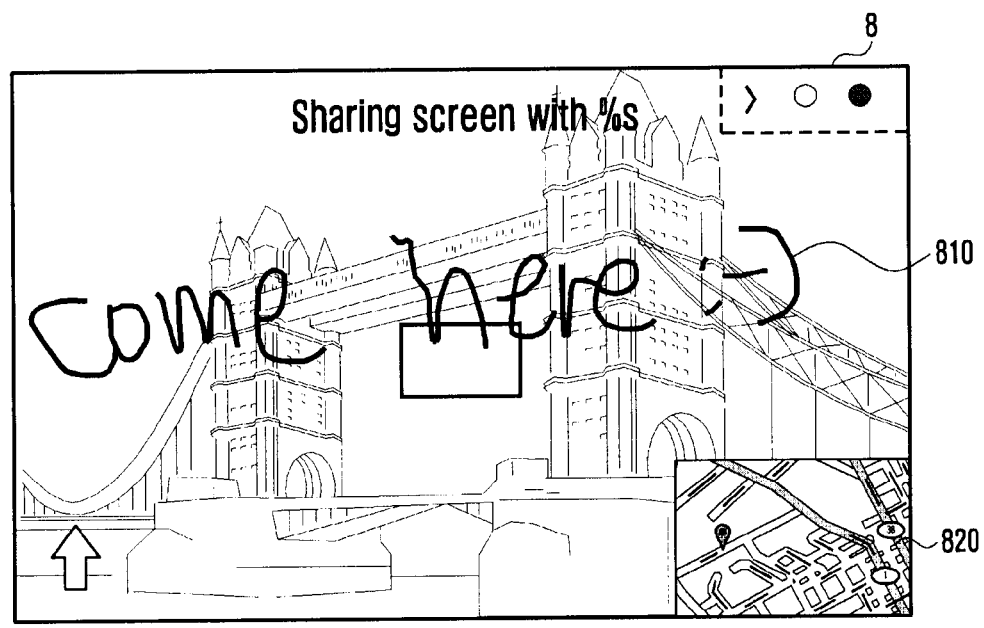
FIG. 8 illustrates a screenshot of a handwriting function and a location indication function of a messenger-based video call service in accordance with an embodiment of the present disclosure.

FIG. 8 illustrates a screenshot of a handwriting function and a location indication function of a messenger-based video call service in accordance with an embodiment of the present disclosure.

Referring to FIG. 8, when a user selects a handwriting menu item in the menu displayed on the touch screen, the mobile device may operate in a handwriting input mode. Then, the control unit 170 may detect a handwriting input using a stylus pen or a finger from the touch screen.

As shown, a user can handwrite on the preview sharing screen. Then, the touch screen 110 may display handwriting data on the preview sharing screen. The control unit 170 may create video call data including handwriting data on the basis of both image data collected by the camera sensor and handwriting data received from the touch screen. Also, using such video call data including handwriting data, the control unit 170 may perform a video call with the video call sharer. In response, the video call sharer can see the handwriting data on the preview sharing screen.

Meanwhile, a user can select a location indication function in the menu displayed on the touch screen. Then, the control unit 170 may obtain location information through a GPS receiver of the mobile device, retrieve map information matched with the location information, and display on the preview sharing screen a map that indicates the location of the mobile device.

Figure 9:
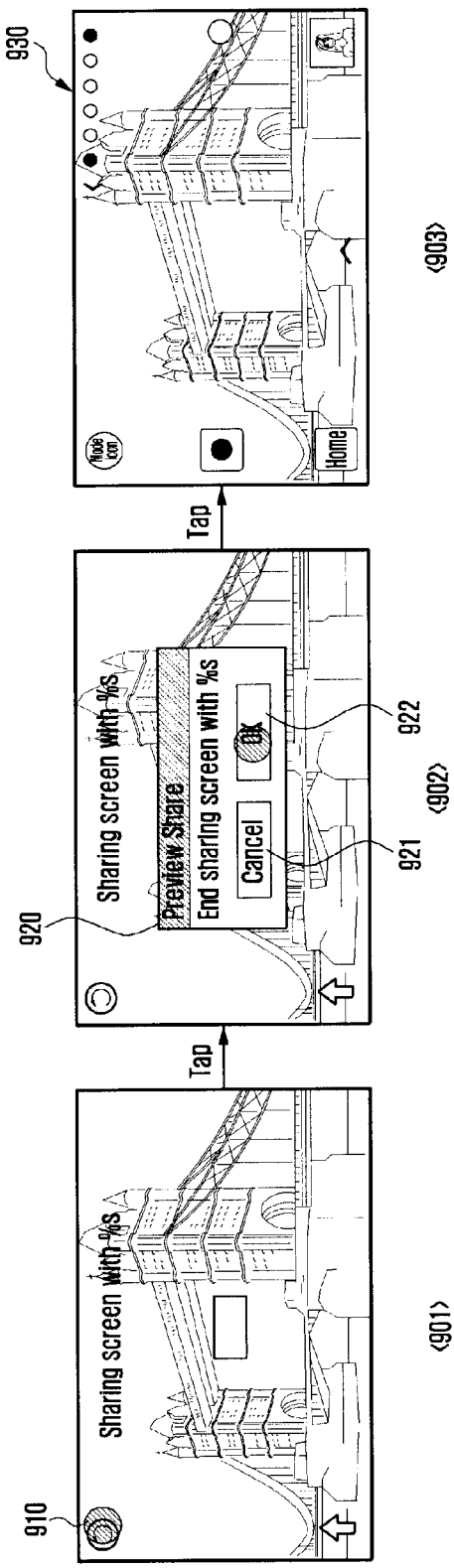
FIG. 9 illustrates screenshots illustrating an ending function of a messenger-based video call service in accordance with an embodiment of the present disclosure.

FIG. 9 illustrates screenshots illustrating an ending function of a messenger-based video call service in accordance with an embodiment of the present disclosure.

Referring to FIG. 9, a user can end a messenger-based video call service. A video call service end function may be performed in response to a selection of a relevant end button displayed on the preview sharing screen. Alternatively, the video call service end function may be performed in response to a specific hard key input or a predefined gesture or voice input.

As shown in screenshot 901, a user can select an end button 910. Then, as shown in screenshot 902, the touch screen 110 may display a popup window 920 for inquiring whether to end a video call under the control of the control unit 170. This popup window 920 may contain a cancel button 921 and an okay button 922. When a user selects the okay button 922, a messenger-based video call service is terminated. Then, the touch screen 110 displays again the camera preview screen 930 as shown in screenshot 903.

Figure 10:
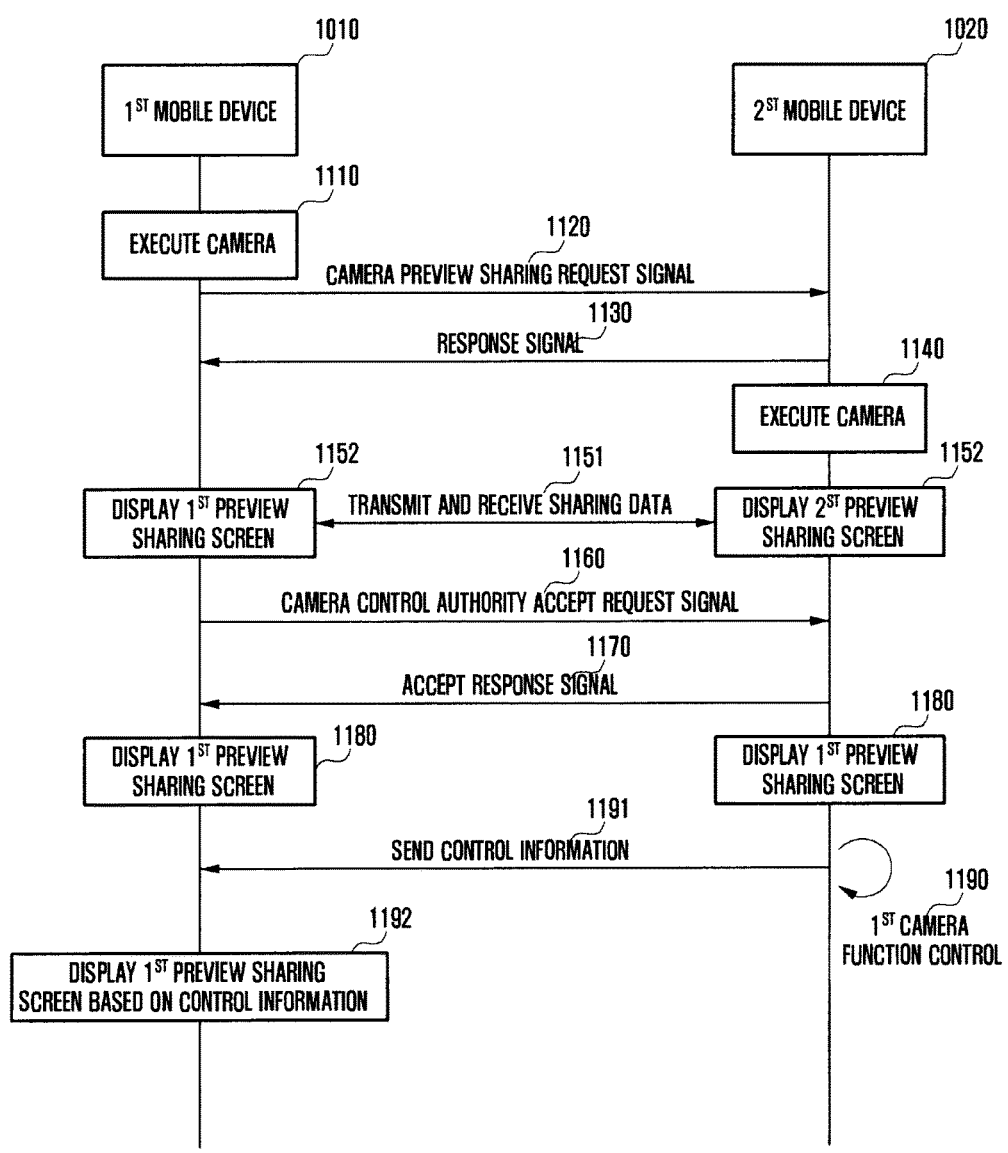
FIG. 10 illustrates a flow diagram of example operations for a camera remote control function of a messenger-based video call service in accordance with an embodiment of the present disclosure.

FIG. 10 illustrates a flow diagram of example operations for a camera remote control function of a messenger-based video call service in accordance with an embodiment of the present disclosure.

Referring to FIG. 10, the mobile device of this disclosure may obtain or transfer a camera function control authority from or to other mobile device in a messenger-based video call mode. In other words, the mobile device may perform a remote control for camera functions of other mobile device or may become a target of remote control by other mobile device.

For illustrative purpose, there are the first mobile device 1010 and the second mobile device 1020.

At step 1110, the first mobile device 1010 executes the camera. At step 1120, to perform a messenger-based video call, the first mobile device 1010 transmits a camera preview sharing request signal to the second mobile device 1020. Then, the second mobile device 1020 transmits a response signal to the first mobile device 1010 at step 1130, and executes the camera at step 1140. At step 1152, the first and second mobile devices 1010 and 1020 perform a video call through a messenger server on the basis of voice and image information collected through the camera preview screen. At this time, the first mobile device 1010 displays the first preview sharing screen, and the second mobile device 1020 displays the second preview sharing screen.

At step 1160, the first mobile device 1010 transmits a control authority accept request signal to the second mobile device 1020 in order to transfer a control authority of the first camera to the second mobile device 1020. At this time, such a camera control authority may be transferred to a selected sharer in a multilateral call.

At step 1170, the second mobile device 1020 transmits an accept response signal to the first mobile device 1010 in order to obtain a control authority of the first camera. Then, at step 1180, both the first and second mobile devices 1010 and 1020 display the first preview sharing screen of the first mobile device 1010. The first mobile device 1010 merely displays the first preview sharing screen and does not control camera functions. Instead, the second mobile device 1020 can control camera functions of the first mobile device 1010. Camera function associated with this authority may include, but not limited to, an image capture function, a focus setting function, a flash determination function, a white balance determination function, a zoom in/out setting function, a screen quality and size adjusting function, and a camera control authority cancel function.

The second mobile device 1020 controls functions of the first camera at step 1190, and transmits these control information to the first mobile device 1010 at step 1191. Then, at step 1192, the first mobile device 1010 can modify the first preview sharing screen based on the control information received from the second mobile device 1020. Thereafter, in response to a camera control authority cancel signal from the first mobile device 1010 or the second mobile device 1020, the function control authority of the first camera is transferred again from the second mobile device 1020 to the first mobile device 1010.

The above-described embodiments of the disclosure can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While this disclosure has been particularly shown and described with reference to an exemplary embodiment thereof, it will be understood by those skilled in the art that various changes in form and details may be made therein without departing from the spirit and scope of the disclosure as defined by the appended claims.

What is claimed is:

1. An apparatus comprising:
   a wireless communication module;
   a display;
   a camera; and
   a controller configured to:
   obtain a first image using the camera;
   display the first image via the display;
   transmit the first image to an external electronic device;
   generate content corresponding to at least one portion of the displayed first image based at least in part on an input, the content including a second image or a handwritten input;
   transmit the content to the external electronic device using the wireless communication module such that the second image or the handwritten input is reproduced at the external electronic device in relation with at least one portion of the transmitted first image;
   obtain, a still image from the first image, based at least part on a command received from the external electronic device, the still image captured by the camera at a time point corresponding to the command;
   display an interface requesting a user input from the apparatus, indicating whether to send the image, responsive to obtaining the still image based at least in part on the command received from the external electronic device; and
   transmit the still image to the external electronic device, responsive to receiving user input in the interface from the apparatus indicating to send the still image.

2. The apparatus of claim 1, wherein the controller is configured to:
   establish, using the wireless communication module, a data communication connection with the external electronic device prior to the transmitting of the first image, based at least in part on a selection of an indication representing an user corresponding to the external electronic device.

3. The apparatus of claim 1, wherein the controller is configured to:
   convert the first image or the content into data packet using a video call application.

4. The apparatus of claim 1, wherein the controller is configured to:
   transmit the first image substantially in real-time as the first image is captured via the camera.

5. The apparatus of claim 1, wherein
   transmit the second image including a map of the location of the apparatus.

6. The apparatus of claim 1, wherein the controller is further configured to control a focus of the camera using the command.

7. A machine-readable storage device storing instructions that, when executed by one or more processors, cause the one or more processors to perform operations comprising:

obtaining, at an electronic device including a camera and a controller, a first image using the camera, the obtaining including displaying the first image via a display operatively coupled with the controller;

transmitting, via a wireless communication module operatively coupled with the controller, the first image to an external electronic device;

generating content corresponding to at least one portion of the displayed first image based at least in part on an input, the content including a second image or a handwritten text;

transmitting the content to the external electronic device using the wireless communication module such that the second image or the handwritten text is reproduced at the external electronic device in relation with at least one portion of the transmitted first image, obtaining, a still image based at least part on a command received from the external electronic device, the still image captured by the camera at a time point corresponding to the command;

displaying an interface at the electronic device, the interface including a scaled down version of the still image and a request for an input indicating whether or not to send the still image, responsive to obtaining the still image based at least in part on the command received from the external electronic device; and transmitting the still image to the external electronic device, when receiving the input to send the still image in the interface at the electronic device.

8. The machine-readable storage device of claim 7, wherein the obtaining comprises:

establishing, using the wireless communication module, a data communication connection with the external electronic device prior to the transmitting of the first image, based at least in part on a selection of an indication representing an user corresponding to the external electronic device.

9. The machine-readable storage device of claim 7, wherein the transmitting comprises:

transmitting the first image in substantially real time as the image is captured via the camera.

10. The machine-readable storage device of claim 7, wherein the operations further comprise controlling a focus of the camera using the command transmitted from the external electronic device corresponding to the focus.

\* \* \* \* \*